Feb. 10, 1959 V. B. FRANCO 2,873,352
WATERPROOF PLASTIC HEATING PAD
Filed June 17, 1957

INVENTOR.
Vincent B. Franco
BY Emery, Whittemore,
Sandoe & Dix.
ATTORNEYS

United States Patent Office 2,873,352
Patented Feb. 10, 1959

2,873,352

WATERPROOF PLASTIC HEATING PAD

Vincent B. Franco, West New York, N. J., assignor to Vincraft Inc., Hoboken, N. J., a corporation of New Jersey Application June 17, 1957, Serial No. 665,915

3 Claims. (Cl. 219—46)

This invention relates to electric heating pads, and more especially to a construction which is simple and inexpensive to manufacture and which produces a waterproof heating pad.

It is an object of the invention to provide an improved heating pad having a plastic waterproof cover which is sealed around the edges of the pad and made with special water-tight sealing around the wires that lead into the heating unit of the pad at one region around the edges.

Although a combination of heat and moisture is beneficial for many ailments for which heating pads are used, there has been danger in using conventional heating pads with wet towels or other moisture holders because of the possibility of entry of water into the interior of the pad. Even when heating pads have been placed in rubber or other waterproof envelopes to protect them from the moisture, it has been particularly difficult to prevent moisture from getting into the pad at the places where the wires extend through the waterproof envelope and into the covering of the pad itself.

This invention provides a heating pad with plastic front and back panels sealed around the edges of the panel and forming a thoroughly waterproof container for the heating unit. At the location where the wires extend into the space between the panels that enclose the heating unit, there is a special construction in which tabs extending from the panels are sealed around the wires. In the preferred construction, this is a heat-seal formed by fusing material of the cover panels to a plastic outer layer of insulation around the wires.

Other objects, features and advantages of the invention will appear or be pointed out as the description proceeds.

In the drawing, forming a part hereof, in which like reference characters indicate corresponding parts in all the views.

Figure 1:
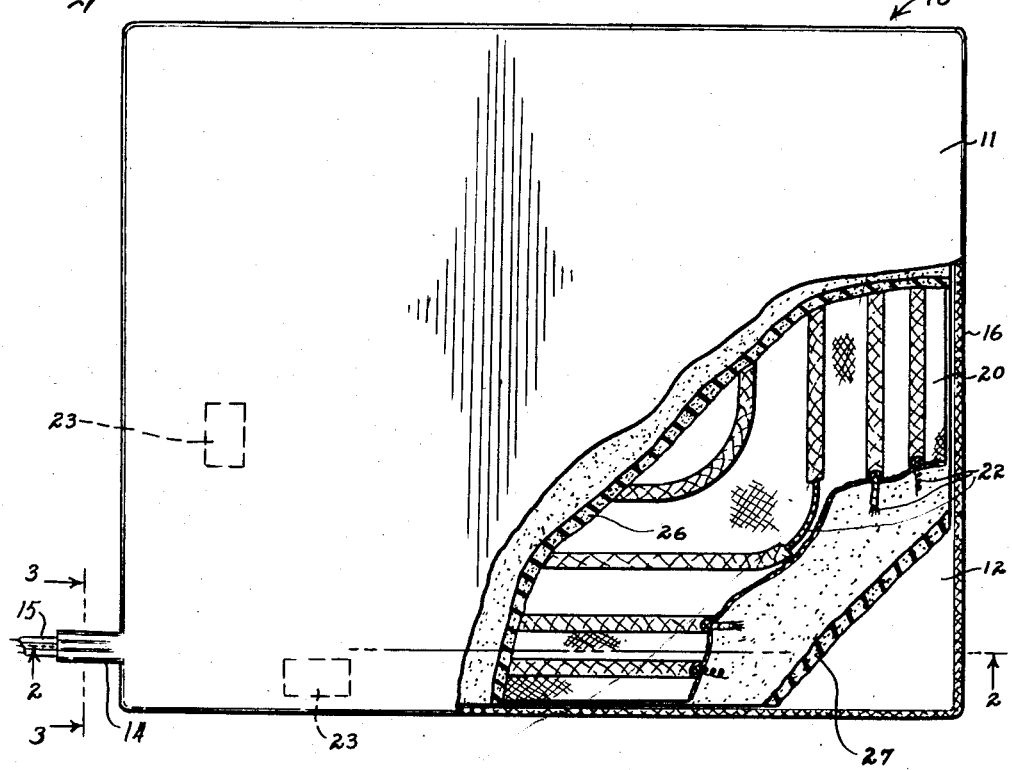
Figure 1 is a plan view, partly broken away and in section, showing a heating pad made in accordance with this invention.

The heating pad 10, shown in Figure 1, includes a front panel 11 and a back panel 12 which are preferably made of waterproof plastic material of a type which can be sealed by the application of heat. Such heat-sealing plastics are so well known in the art that no explanation of the particular kinds of material is necessary for a complete understanding of this invention. The front and rear panels 11 and 12, respectively, have their confronting faces bonded together along an area extending around the entire perimeter of these panels 11 and 12, except at a short region at one end where there are tabs 14 extending from the panels and where an opening has to be provided for the entrance of wires 15 into the space between the panels 11 and 12.

At the region of Figure 1 where the front panel 11 is broken away, the area of the rear panel 12, which is bonded to the front panel 11, is indicated by cross hatching and by the reference character 16.

Although the panels 11 and 12, and the tabs 14 which form parts of these panels, are bonded together by heating and fusing the material of the confronting faces of the panels themselves, it will be understood that some features of the invention can be applied to constructions in which the bonded area 16 are covered with an adhesive which bonds to the confronting faces; but use of such adhesive does not obtain the full benefit of the economical manufacturing operations to which the construction of this invention lends itself.

One of the requisites for the comfortable use of a heating pad is that the pad be flexible and capable of deforming easily to the shape of the particular part of the body to which heat is to be applied. In order to obtain a high degree of flexibility and at the same time use a strong waterproof plastic material for the panels 11 and 12, it is a feature of the construction that these panels 11 and 12 are placed against one another in a flat condition and are bonded together along their confronting faces so as to form a container for the heating unit free of any side walls or corners which would stiffen the container. In effect, the panels 11 and 12, when bonded together, form an envelope which is easily bent either lengthwise or crosswise to conform to the shape of the body surface against which the heating pad is held.

The heating unit for the pad includes a pliant holder, such as a woven cloth 20, to which an electric resistance heating unit 22 is attached. The wires of this electric heating unit 22 are preferably covered with cloth or other protection for distributing the heat and the temperature to which the wires 22 are heated is controlled by thermostats 23 located within the pad and attached to the holder 20. This construction of the heating unit is entirely conventional and is well understood in the art.

In order to distribute the heat more uniformly, and without impairing the flexibility of the heating pad, there are two pads 26 and 27 located in front of and behind, respectively, the heating unit 20. Each of these pads 26 and 27 is preferably made of open cell, polyvinyl chloride foam, but other pads, such as foam rubber or similar soft materials, can be used. In the preferred construction, these polyvinyl chloride foam pads 26 and 27 have special advantages in that they provide a soft and resilient pad capable of withstanding very high temperatures without deterioration and without change in the resilient physical characteristics.

Figure 2:
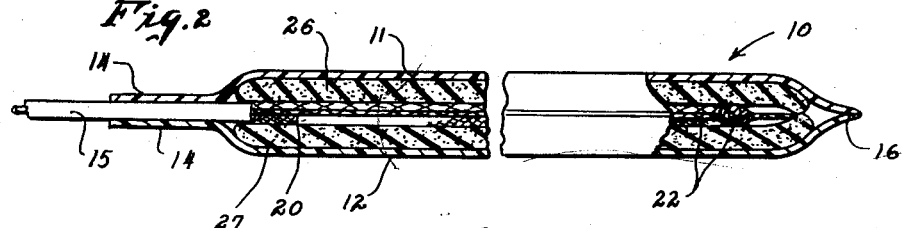
Figure 2 is a fragmentary, enlarged-scale, sectional view taken on the line 2—2 of Figure 1.

Each of the pads 26 and 27 is of a size to substantially fit the space between the panels 11 and 12 within the bonded areas 16 so that the pads 26 and 27 do not come between the faces of the panels 11 and 12 which are bonded over the areas 16 during the manufacture of the pad. Some little clearance around the perimeter of each pad 26 and 27, and the unattached edge regions inward from the bonded areas 16, is desirable so as to permit space for divergence of the panels 11 and 12 from one another as they extend away from the sealed area 16. This construction is clearly illustrated in Figure 2 of the drawing.

Figure 4:
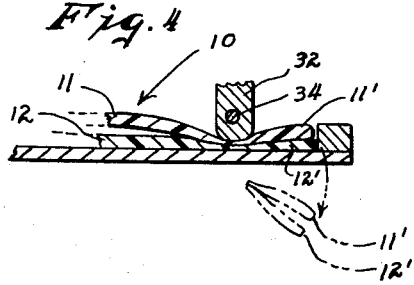
Figure 4 is a greatly enlarged sectional view showing the way in which the front and back panels of the heating pad are fused or "welded" together.

In order to provide a more attractive and better-finished edge around the perimeter of the pad 10, the edge portions of the panels 11 and 12 are heat-sealed under sufficient pressure to squeeze the outer portions of the sealed areas down to a very thin section, as indicated by the reference character 20 in Figure 4. This figure shows the heat-sealing operation performed by a tool 32 having a heating element 34 therein. After the panels 11 and 12 have been heat-sealed or welded together by the tool 32, the connection is allowed to cool, and the outer edges, designated by the reference characters 11' and 12', are then torn off, as indicated in dotted lines in Figure 4.

This leaves the heating pad with an edge that tapers down to a very thin section, or which may be somewhat rounded, the term "taper" being used herein to merely indicate a reduction in thickness whether along a straight or curved surface. In the preferred construction, the panels 11 and 12 taper to what may be referred to as a "feather edge."

At the left-hand edge of the heating pad 10, the upper and lower edges of the tabs 14 are heat-sealed or welded together in the same manner as the other edges of the heating pad panels 11 and 12 along bonded areas 16. For operating the conventional heating pad unit, which has three degrees of heat, three wires 15 are led into the interior of the heating pad through the sleeve formed by the tabs 14. To permit neater installations, these wires are supplied with insulation around the individual wires and with an outer layer of insulation around all three of the wires so that the three wires are a flat, unitary conductor assembly.

This conductor assembly is of substantially the same width as the sleeve formed by the tabs 14 and in the preferred construction of the invention, the outside insulation of this unitary conductor assembly is made of plastic material, preferably vinyl plastic, to which the tabs 14 can be bonded, preferably by merely applying heat and pressure in the same manner as is used to bond the panels 11 and 12 to one another around their edge portions.

Figure 3:
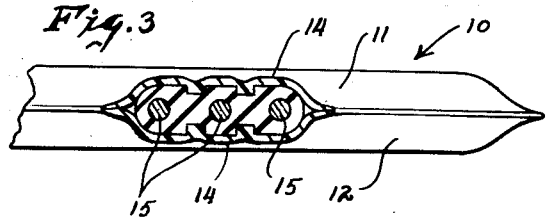
Figure 3 is a greatly enlarged sectional view taken on the line 3—3 of Figure 1.

Although there are ordinarily grooves in the surface of the outside insulation around the wires 15 along lines between the wires, these grooves are shallow and the material of the tabs 14 is sufficiently resilient and stretchable to be forced into the grooves and to fill the grooves as indicated in Figure 3.

The pressure applied to the tabs 14 for sealing them to the outside insulation of the wires 15 is sufficient to cause some distortion of the insulation into the vertices of the angles where the upper and lower tabs 14 come together at their bonded areas 16. From an inspection of Figure 3 is will be apparent that the inside faces of the tabs 14 are bonded to the outside of the insulation around the wires 15 so that there is a completely watertight seal around the wires.

In addition to the effective waterproof cover provided by this invention for the heating unit of the pad, the invention has the outstanding advantage that it can be manufactured at extremely low cost. For example, all of the sealing of the front and rear panels, including the sealing of the panel tabs 14 around the insulation of the wires, is performed by pressure applied substantially normal to the front and rear surfaces of the heating pad. The manufacture entails merely the assembly of the parts in a flat condition and without any very careful locating of parts with respect to one another; and then entails the sealing of all edges and of the clearance around the wires by a pressing and heating operation which can be done all at one time, though the sealing of the tabs to the wires can be performed as a separate operation, if desired, for the purpose of simplifying the press.

The feather edge can be obtained around the entire perimeter of the heating pad except across the edge faces of the tabs 14 which pass over and under the wires 15. Around all other portions of the edges of the tabs 14 and the front and rear panels 11 and 12, sufficient pressure to produce a feather edge can be easily applied and the thick outer edges beyond the seal can be torn off, preferably manually, as already explained in connection with Figure 4.

The expressions "heat-sealed" and "fused" are used herein to designate a condition brought about by heating the confronting faces of the panels to a temperature at which the faces adhere to one another upon cooling. Actual melting of the plastic to a liquid is not essential.

The preferred embodiment of the invention has been illustrated and described, but some changes and modifications can be made and some features can be used in different combinations without departing from the invention as defined in the claims.

What is claimed is:

1. An electric heating pad comprising a heating element having an insulated conductor cable for supplying power thereto, an outside cover including a front panel comprising a sheet of waterproof plastic material, a rear panel comprising a different sheet of waterproof plastic material, the sheets being of similar size and each sheet being of substantially uniform thickness throughout its entire area, and the sheets having confronting faces which contact with one another around the edge regions of the panels where the confronting faces are parallel to one another, the confronting faces of the panels being bonded to one another where they contact and then diverging from one another at a dihedral angle as the panels extend inwardly away from the edges, the panels contacting with one another, around the entire perimeter of the panels except at the location of said conductor, the contacting edge regions of the front and rear panels being bonded directly to one another up to the conductor on both sides thereof, and said edge regions of the panels being bonded to the insulation of the conductor when they pass over and under the conductor, different heat distributing pads in front of and behind the heating element and extending into the dihedral angle, and tabs extending from an edge of each of the front and rear panels at corresponding locations, the tabs being parts of the respective sheets from which they extend and said tabs being bonded together along their side adges all the way to the junction of the tabs with the edges of the panels so that the tabs form a sleeve into which the conductor fits snugly and through which the conductor passes, the confronting faces of the sleeve over at least the end regions remote from the panels being bonded to the outside surface of the conductor around the entire perimeter of the conductor.

2. The electric heating pad described in claim 1 and in which the conductor includes a plurality of spaced wires with a body of insulation around the separate wires, but with the bodies of insulation connected together into a unitary section having surface grooves, and in which the bonding of the tabs to the conductor insulation fills the grooves and forms a continuous and water-tight seal around the conductor.

3. The electric heating pad described in claim 1 and in which the insulation around the wires has an outside surface made of heat-sealing plastic material, and the sheets are also made of similar heat-sealing plastic material, and the bonding of the tabs to the conductor consists of a fusing of the confronting surfaces with one another and an engagement of the tab material in the grooves of the conductor insulation.

References Cited in the file of this patent

UNITED STATES PATENTS

| | | |
|---|---|---|
| 1,994,759 | Dermott | Mar. 19, 1935 |
| 2,003,830 | Gilbert | June 4, 1935 |
| 2,022,519 | Payne | Nov. 26, 1935 |
| 2,411,677 | Christenson | Nov. 26, 1946 |
| 2,610,286 | Cox | Sept. 9, 1952 |
| 2,617,011 | MacKendrick | Nov. 4, 1952 |
| 2,666,839 | Boetel | Jan. 19, 1954 |
| 2,783,358 | Wolf | Feb. 26, 1957 |